United States Patent
O'Neill et al.

(10) Patent No.: US 8,625,877 B2
(45) Date of Patent: Jan. 7, 2014

(54) METHODS OF OPERATING AN IMAGE-BASED CHECK PROCESSING SYSTEM TO DETECT A DOUBLE FEED CONDITION OF CARRIER ENVELOPES AND AN APPARATUS THEREFOR

(75) Inventors: Darryl S. O'Neill, Waterloo (CA); Michael Ancell, Kitchener (CA)

(73) Assignee: NCR Corporation, Duluth, GA (US)

( * ) Notice: Subject to any disclaimer, the term of this patent is extended or adjusted under 35 U.S.C. 154(b) by 40 days.

(21) Appl. No.: 13/327,261

(22) Filed: Dec. 15, 2011

(65) Prior Publication Data

US 2013/0156290 A1 Jun. 20, 2013

(51) Int. Cl.
*G06K 9/00* (2006.01)

(52) U.S. Cl.
USPC ........... 382/140; 382/137; 382/139; 209/569; 209/583; 271/258.01

(58) Field of Classification Search
None
See application file for complete search history.

(56) References Cited

U.S. PATENT DOCUMENTS

| | | | | |
|---|---|---|---|---|
| 3,629,822 A * | 12/1971 | Johnson | | 382/320 |
| 3,938,089 A * | 2/1976 | McGregor et al. | | 382/318 |
| 4,243,983 A * | 1/1981 | Vyas | | 340/674 |
| 4,510,615 A * | 4/1985 | Rohrer | | 382/139 |
| 5,673,333 A * | 9/1997 | Johnston | | 382/137 |
| 5,861,646 A * | 1/1999 | Czesnik et al. | | 250/559.4 |
| 6,123,260 A * | 9/2000 | Menzenski | | 235/449 |
| 6,364,556 B1 * | 4/2002 | Barbera et al. | | 400/708 |
| 6,384,844 B1 * | 5/2002 | Stewart et al. | | 715/764 |
| 6,473,519 B1 * | 10/2002 | Pidhirny et al. | | 382/140 |
| 6,473,674 B1 * | 10/2002 | Okada | | 700/227 |
| 6,504,946 B1 * | 1/2003 | Rossignoli | | 382/139 |
| 6,647,136 B2 * | 11/2003 | Jones et al. | | 382/137 |
| 6,654,487 B1 * | 11/2003 | Downs, Jr. | | 382/139 |
| 6,956,962 B1 * | 10/2005 | Hayosh | | 382/139 |
| 7,606,408 B2 * | 10/2009 | Takiguchi | | 382/139 |
| 7,644,043 B2 * | 1/2010 | Minowa | | 705/45 |
| 7,689,025 B2 * | 3/2010 | Takiguchi | | 382/139 |
| 7,845,637 B2 * | 12/2010 | Shimazaki | | 271/262 |
| 7,978,900 B2 * | 7/2011 | Nepomniachtchi et al. | | 382/137 |
| 8,091,784 B1 * | 1/2012 | Ma et al. | | 235/449 |
| 8,162,125 B1 * | 4/2012 | Csulits et al. | | 194/206 |
| 8,218,851 B1 * | 7/2012 | Cantley et al. | | 382/137 |
| 8,231,057 B1 * | 7/2012 | Buentello et al. | | 235/462.11 |
| 2002/0051562 A1 * | 5/2002 | Sheppard et al. | | 382/137 |
| 2004/0062431 A1 * | 4/2004 | O'Neill | | 382/137 |
| 2005/0018896 A1 * | 1/2005 | Heit et al. | | 382/137 |
| 2011/0243394 A1 * | 10/2011 | Matsuo et al. | | 382/115 |
| 2012/0170829 A1 * | 7/2012 | Jackson et al. | | 382/140 |

* cited by examiner

*Primary Examiner* — Vu Le
*Assistant Examiner* — Alexander J Lesnick
(74) *Attorney, Agent, or Firm* — Michael Chan

(57) ABSTRACT

A method is provided of operating an image-based check processing system to detect a double feed condition of carrier envelopes. An example method includes attempting to read a magnetic ink character recognition (MICR) codeline from a first predefined area of an image of a document item, determining if the document item is a carrier envelope, concluding that the document item is not a double-fed item when a determination is made that the document item is a carrier envelope, and concluding that the document item is potentially a double-fed item when a determination is made that the document item is not a carrier envelope.

10 Claims, 8 Drawing Sheets

METHODS OF OPERATING AN IMAGE-BASED CHECK PROCESSING SYSTEM TO DETECT A DOUBLE FEED CONDITION OF CARRIER ENVELOPES AND AN APPARATUS THEREFOR

TECHNICAL FIELD

This present invention relates to processing document items in an image-based check processing system, and is particularly directed to methods of operating an image-based check processing system to detect a double feed condition of carrier envelopes and an apparatus therefor.

Background

A typical image-based check processing system includes a check processing transport which has a document track and a number of check processing modules positioned along the document track for performing specific document processing operations on document items including checks moving downstream along the document track. The check processing system also includes a transport processor which executes a transport application program which is stored in memory to control operation of devices contained within the check processing modules positioned along the document track and thereby to control operation of the check processing transport.

A typical check processing transport includes a hopper into which a stack of document items is placed. An operator initially prepares the document items (e.g., orienting document items properly (forwards and upside right), removing staples, removing paper clips, straightening bent corners, and the like) before they are placed into the hopper. A document feeder adjacent the hopper selectively feeds or drives each document item from the stack of document items in the hopper to transport the document item from the upstream end to the downstream end along the document track past a magnetic ink character recognition (MICR) reader and an image capture device. The MICR reader reads a codeline from each document item. The image capture device captures an image of the front of the document item and an image of the back of the document item. The document items are eventually transported to sorting pockets of a pocket device located at the downstream end of the document track. The pockets receive document items which have been sorted based upon the particular transport application program.

From time to time, a double feed condition occurs (e.g., two overlapping document items) when only one document item should have been fed along the document track. The occurrence of a double feed condition causes an undesirable result. A double feed condition of document items would result in one of the document items being missed and not processed. Eventually at some later time during balancing, it takes up much time from a human operator to locate the unprocessed document item and then to reprocess it to complete the balancing function. This is time-consuming and costly.

A particular type of document item which is used in check processing operations is a carrier envelope. A carrier envelope is a piece of opaque paper with a clear plastic cover on the front that forms a pocket to hold a damaged, foreign or other item that may require special handling. There is room at the bottom of the carrier envelope to allow encoding thereof. As an example, a torn or badly curled check would be placed into the pocket of the carrier envelope.

A drawback in the use of carrier envelopes in a check processing operation is that they usually cause disproportionately more false double feed warnings as compared to other types of document items. This is simply due to the nature of carrier envelopes. Accordingly, human operators spend disproportionately more time in handling false double feed exceptions involving carrier envelopes than with other types of document items.

Sometimes an operator will disable a double feed detection feature when carrier envelopes are being processed to avoid having to waste time dealing with false double feed exceptions. This creates a problem though if the operator forgets to re-enable the double feed detection feature and leaves it off. The problem is that valid double-fed items will be missed. Missed double-fed items create "day two" work to find the missing document item and then to reprocess it. This is again time-consuming and costly. It would be desirable to provide methods of detecting a double feed condition of carrier envelopes in a check processing operation so that double feed detection is improved without having to take up more human operator time.

Summary

In accordance with one embodiment, a method is provided of operating an image-based check processing system to detect a double feed condition of carrier envelopes. The method comprises attempting to read a magnetic ink character recognition (MICR) codeline from a first predefined area of an image of a document item. Based upon the attempted read of a MICR codeline from the first predefined area of the item image, a determination is made if the document item is a carrier envelope. A conclusion is made that the document item is not a double-fed item when a determination is made that the document item is a carrier envelope. A conclusion is made that the document item is potentially a double-fed item when a determination is made that the document item is not a carrier envelope. The method may further comprise attempting to read a MICR codeline from a second predefined area which is different from the first predefined area of the item image. Based upon the attempted read of a MICR codeline from the second predefined area of the item image, a determination is made if the item image has a valid MICR codeline. A conclusion is made that the document item is not a double-fed item when a determination is made that a valid MICR codeline has been read from the second predefined area of the item image. A conclusion is made that the document item is potentially a double-fed item when a determination is made that a valid MICR codeline has not been read from the second predefined area of the item image.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

The present invention is directed to methods of operating an image-based check processing system to detect a double feed condition of carrier envelopes. The specific construction and use of the image-based check processing system may vary. The check processing system may be, for example, a sorting machine or a proof machine wherein financial document items are processed in a bank. The financial document items may be in any number of forms. As examples, a financial document item may be in the form of a check, a deposit slip, a cash-in slip, or a cash-out slip.

Figure 1:
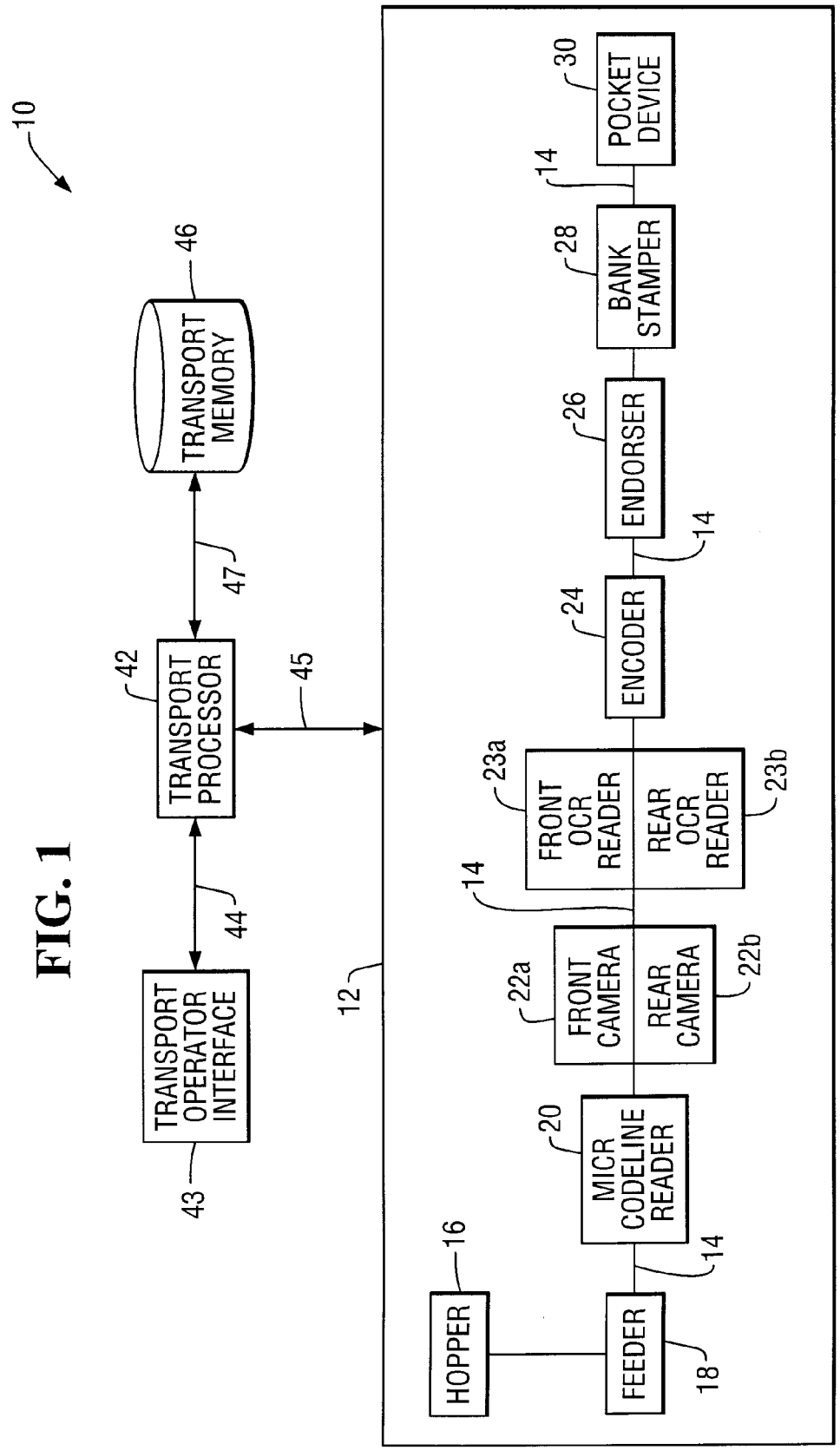
FIG. 1 is a schematic block representation of an image-based check processing system in accordance with one embodiment.

An example image-based check processing system is shown in FIG. 1, and designated with reference numeral 10. The check processing system 10 includes a check processing transport 12 having a document track 14 along which financial document items, such as checks, can be transported from an upstream end to a downstream end. The transport 12 includes a number of different check processing modules positioned along the document track 14. Each check processing module includes a number of devices associated with the particular check processing module for performing specific document processing operations on document items moving along the document track 14. The transport 12 includes a hopper 16 into which a stack of financial document items including checks are placed. A document feeder 18 adjacent the hopper 16 selectively feeds or drives each document item from the stack of document items in the hopper to transport the document item from the upstream end to the downstream end along the document track 14.

The check processing system 10 also includes a magnetic ink character recognition (MICR) codeline reader 20 located along the document track 14. The MICR reader 20 reads a MICR codeline from the front of each physical document item being transported and processed along the document track 14. The check processing system 10 includes electronic front and rear image capture devices 22a, 22b located along the document track 14. The front image capture device 22a captures an electronic image of the front of each document item. Similarly, the rear image capture device 22b captures an electronic image of the rear of each document item. More specifically, the front image capture device 22a may include a front imaging camera, and the rear image capture device 22b includes a rear imaging camera. Structure and operation of MICR codeline readers and electronic imaging cameras are well known and, therefore, will not be described.

The check processing system 10 further includes front and rear optical character recognition (OCR) reader devices 23a, 23b located along the document track 14. The front OCR reader 23a performs an OCR read of the front image captured by the front imaging camera 22a. Similarly, the rear OCR reader 23b performs an OCR read of the rear image captured by the rear imaging camera 22b. Structure and operation of OCR readers devices are well known and, therefore, will not be described.

Although the above description describes the OCR readers 23a, 23b in hardware form, it is conceivable that the OCR readers be in software form, or a combination of both hardware and software. In the case of software OCR, the controlling software for OCR functionality may reside on a transport processor 42 shown in FIG. 1. The controlling software for software OCR may reside on a different processor, or on a server, or on a combination of different processors and servers. For convenience, OCR readers in software form will be used in the description hereinbelow.

The check processing system 10 may optionally include an encoder 24, an endorser 26, or a bank stamper 28, as shown in FIG. 1. The encoder 24 encodes missing fields on each check. The endorser 26 applies an endorsement in a known manner to each check. The bank stamper 28 stamps each check to identify the bank institution processing the check. Structure and operation of encoders, endorsers, and bank stampers are well known and, therefore, will not be described.

The check processing system 10 also includes a pocket device 30 located at the downstream end of the document track 14. The pocket device 30 has a number of different types of pockets into which processed document items are pocketed. Example types of pockets include on-us pockets, transit pockets, and reject pockets. Structure and operation of pockets in the pocket device 30 are well known and, therefore, will not be described.

The check processing system 10 further includes the transport processor 42 and a transport operator interface 43 which communicates via signals on line 44 with the transport processor. The operator interface 43 may include a keyboard, a mouse, and a display, all of which communicate via signals with the transport processor 42. The transport processor 42 controls operation of the transport 12 via signals on line 45. The check processing system 10 also includes a transport memory 46 which communicates via signals on line 47 with the transport processor 42. The memory 46 may comprise a single memory unit or a plurality of different memory units. An executable transport application program is stored in the memory 46. The transport application program is associated with a particular type of document processing work. For example, one type of work is proof of deposit. Another type of work is remittance processing. Still another type of work may be encoding and sorting of document items. Suitable processors and memories are readily available in the marketplace. Their structure and operation are well known and, therefore, will not be described.

When the transport application program is executed, the devices contained within check processing modules lying along the document track 14 are controlled to process document items moving downstream along the document track in accordance with the transport application program, as is known. The memory 46 may store sequence numbers, MICR codelines, and image data associated with document items which have been processed in accordance with the transport application program. If applicable, the memory 46 may also store encoder status, endorsement status, or bank stamp status.

Figure 2:
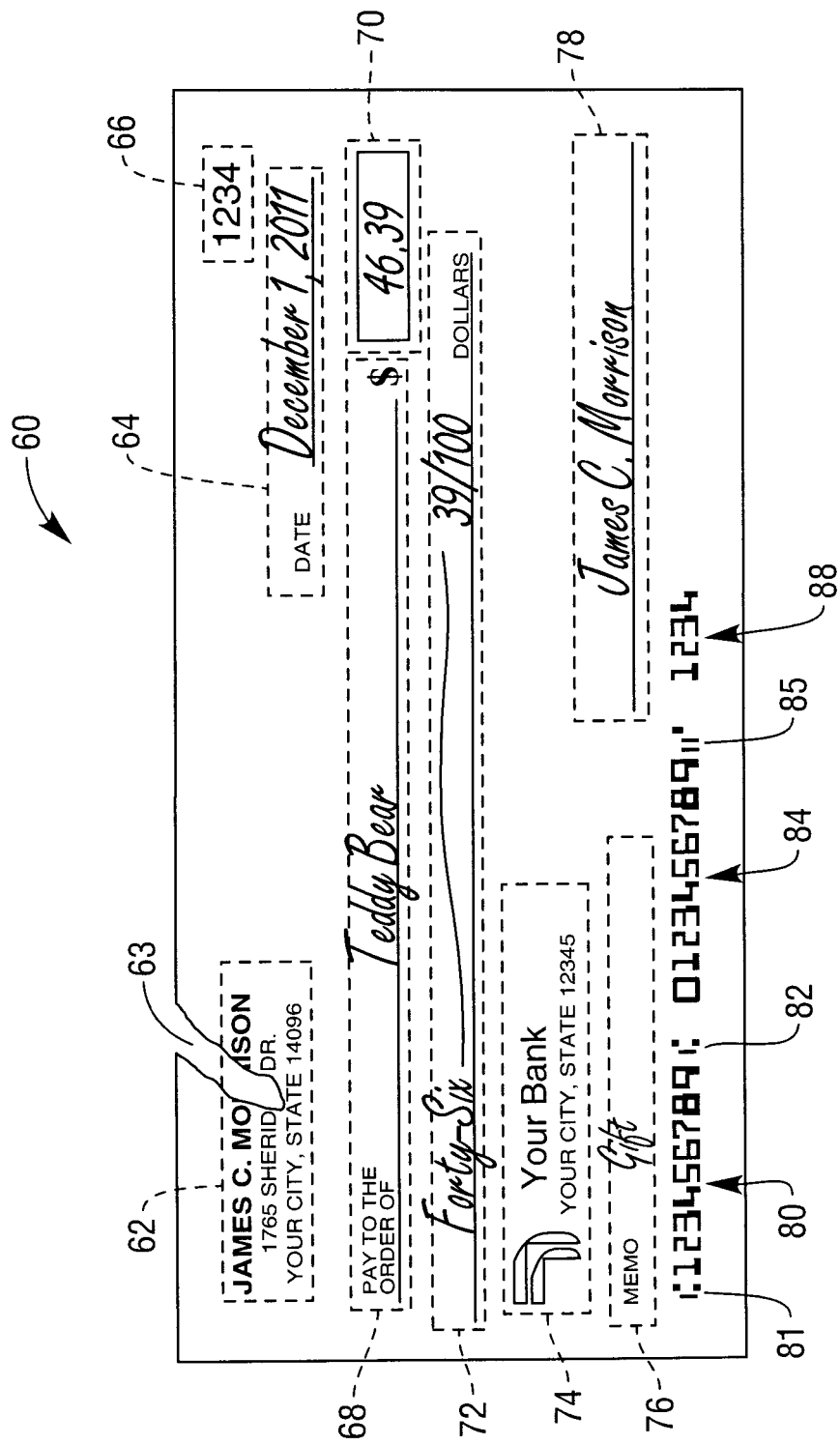
FIG. 2 is a representation of a torn check which can be processed by the system of FIG. 1.

Referring to FIG. 2, a typical check 60 which can be processed by the check processing system 10 of FIG. 1 is illustrated. The check 60 is made of sheet material and includes a payer field 62, a date field 64, a check number field 66 located in the upper-right corner of the check, and a payee field 68. The check 60 also includes a courtesy amount field 70, a legal amount field 72, a paying bank name field 74, a memo field 76, and a payer signature field 78. Each field of the check 60 contains pre-printed information therein, such as shown in FIG. 2. The particular check 60 shown in FIG. 2 has a torn portion 63. Since the check 60 is a torn document item, it needs to be placed into a carrier envelope for special handling as will be described later.

The check 60 also has a MICR codeline which comprises a routing/transit number 80, an account number 84, and a check number 88. The routing/transit number 80 is located between a first transit Q symbol 81 and a second transit Q symbol 82. The account number 84 is located between the second transit Q symbol 82 and an account Q symbol 85, as shown in FIG. 2. The check number 88 is located between the account Q symbol and an amount Q symbol (not shown in FIG. 2). The encoder 24 (FIG. 1) encodes amount Q symbols on the check 60 during processing the check. Other arrangements of routing/transit numbers, account numbers, check numbers, and Q symbols are possible. Format of Q symbols 81, 82, 85 are conventional and well known in the financial industry.

Figure 3:
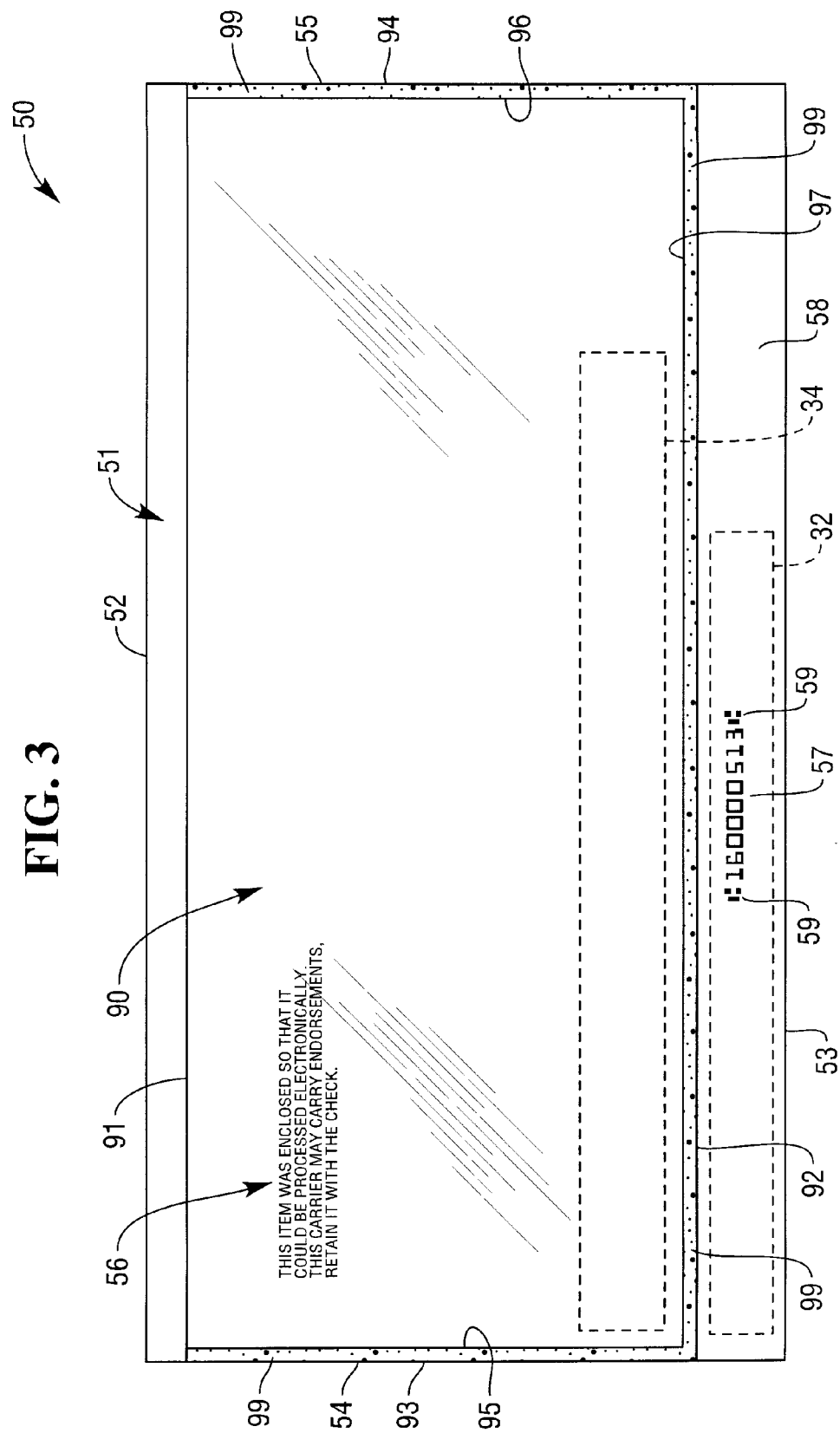
FIG. 3 shows a typical pre-encoded type of carrier envelope which can be processed by the system of FIG. 1.

Referring to FIG. 3, a particular type of document item in the form of a carrier envelope 50 is illustrated. The carrier envelope 50 shown in FIG. 3 is a pre-encoded type of carrier envelope as will be explained later. The carrier envelope 50 comprises a piece of opaque paper 51 with a clear plastic cover 90 on the front that forms a pocket to hold a foreign, damaged or other item which requires special handling. There is room at the bottom of the carrier envelope 50 to allow encoding thereof. As an example, the torn check 60 shown in FIG. 2 would need to be placed into the pocket of a carrier envelope such as the carrier envelope 50 shown in FIG. 3. As another example, a badly curled check (not shown) would need to be placed into the pocket of a carrier envelope such as the carrier envelope 50 shown in FIG. 3.

As shown in FIG. 3, opaque paper 51 extends between its upper edge 52 and its lower edge 53, and between its left edge 54 (as viewed looking at FIG. 3) and its right edge 55. Clear plastic cover 90 extends between its top edge 91 and its bottom edge 92, and extends between its left edge 93 and its right edge 94. Left edge 93 of cover 90 overlies left edge 54 of paper 51, and right edge 94 of cover 90 overlies right edge 55 of paper 51.

A patch of adhesive 99 in a generally U-shape is disposed between paper 51 and cover 90 in the vicinity of bottom edge 92 and left and right edges 93, 94 of cover 90 as shown in FIG. 3 to bond paper 51 and cover 90 together to form a pocket between paper and cover. The pocket extends between left pocket side 95 and right pocket side 96, and extends between pocket bottom 97 and pocket opening located at top edge 91 of cover 90. Text 56 which is descriptive of carrier envelope 50 is pre-printed on paper 51 and is visible through clear cover 90.

A MICR codeline 57 located between pair of transit Q symbols 59 is pre-encoded on bottom portion 58 of paper 51. A carrier envelope with a pre-encoded MICR codeline, such as shown in FIG. 3, is known as a pre-encoded type of carrier envelope. A carrier envelope with no pre-encoded MICR codeline (not shown) is known as a non-encoded type of carrier envelope.

Rectangle 32 shown in dashed lines in FIG. 3 is an imaginary first predefined area which front OCR reader 23a (FIG. 1) attempts to read MICR codeline data from carrier envelope 50 during processing of carrier envelope through check processing system 10 as will be described in detail later. First predefined area 32 is also where MICR codeline reader 20 attempts to read MICR codeline data from carrier envelope 50. First predefined area 32 corresponds to the area in which front OCR reader 23a would scan for presence of a MICR codeline of a typical check such as check 60 shown in FIG. 2. Accordingly, first predefined area 32 corresponds to an area of a typical check item where its MICR codeline would normally be found.

Rectangle 34 shown in dashed lines in FIG. 3 is an imaginary second predefined area which is located above first predefined area 32. Second predefined area 34 is an area which OCR reader 23a attempts to read MICR codeline data from a check item contained in the pocket of the carrier envelope 50. MICR codeline data from an image of a check item in the carrier envelope 50 would normally show through clear cover 90 at a location within second predefined area 32 of the item image.

Size of second predefined area 34 is larger than size of first predefined area 32. The relatively larger size of second predefined area 34 is needed to accommodate a check item which may be in different positions when the check item is inside carrier envelope 50. As an example, the check item may be positioned in the pocket of carrier envelope 50 such that left edge of check item may be all the way to the left next to left pocket side 95, or such that right edge of check item may be all the way to the right next to right pocket side 96. In either case, MICR codeline data of the check item in the carrier envelope 50 will show through the relatively larger window formed by second predefined area 34. Size of second predefined area 34 may vary by particular type of carrier envelope and particular size of carrier envelope.

Front OCR reader 23a may scan second predefined area 34 in a number of different ways. One example way is to scan a fixed zone based upon type of the particular carrier envelope. Another example way is to iteratively attempt to read OCR starting above the first predefined area 32 by moving over a predetermined distance using predetermined step intervals.

Figure 4:
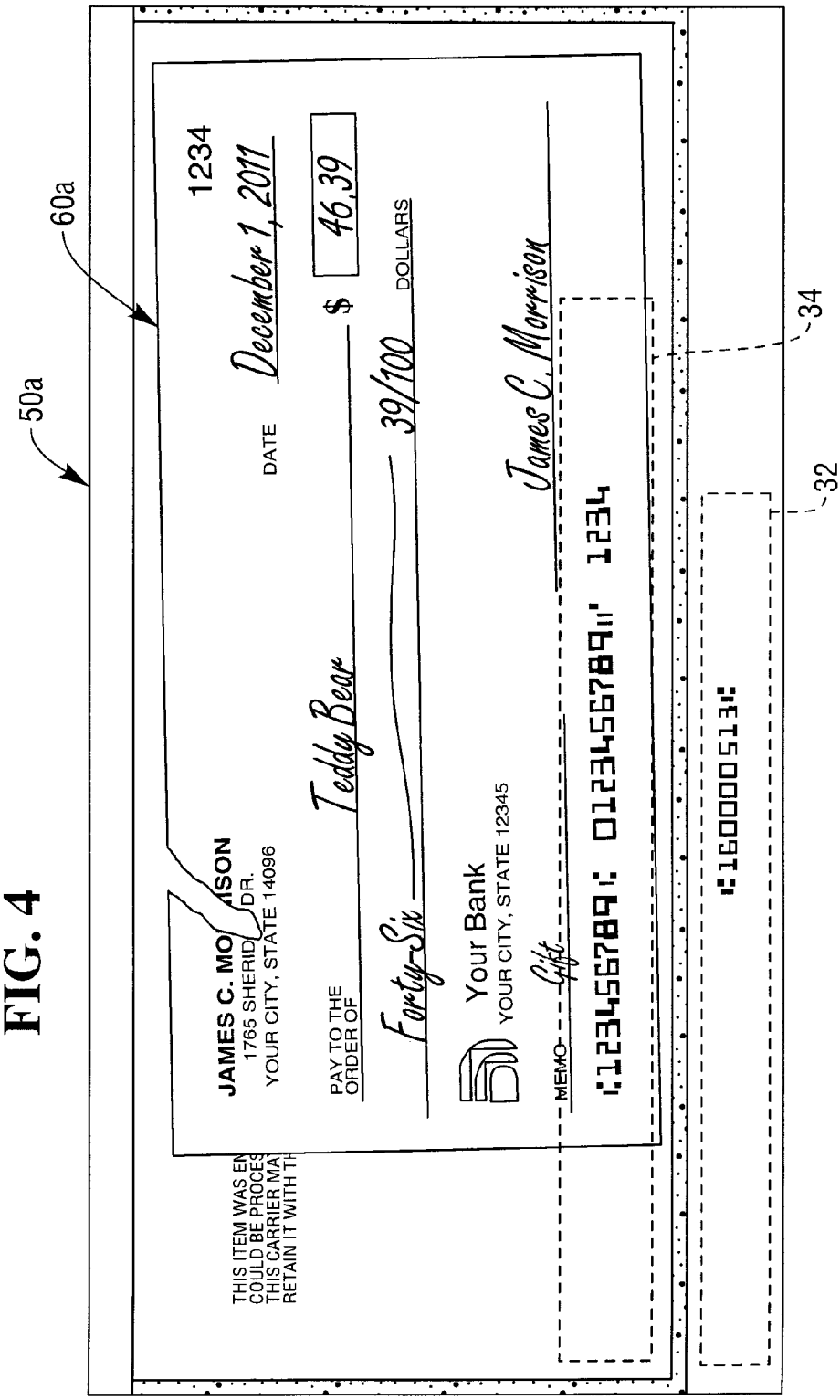
FIG. 4 is a view showing a captured image of the pre-encoded type of carrier envelope of FIG. 3 which contains the torn check of FIG. 2.

Referring to FIG. 4, a captured image of the pre-encoded type of carrier envelope of FIG. 3 which contains the torn check of FIG. 2 is illustrated. The pre-encoded carrier envelope in the image is designated with reference numeral "50a", and is referred to herein as "carrier 50a". The torn check in the image is designated with reference numeral "60a", and is referred to herein as "check 60a".

Figure 5:
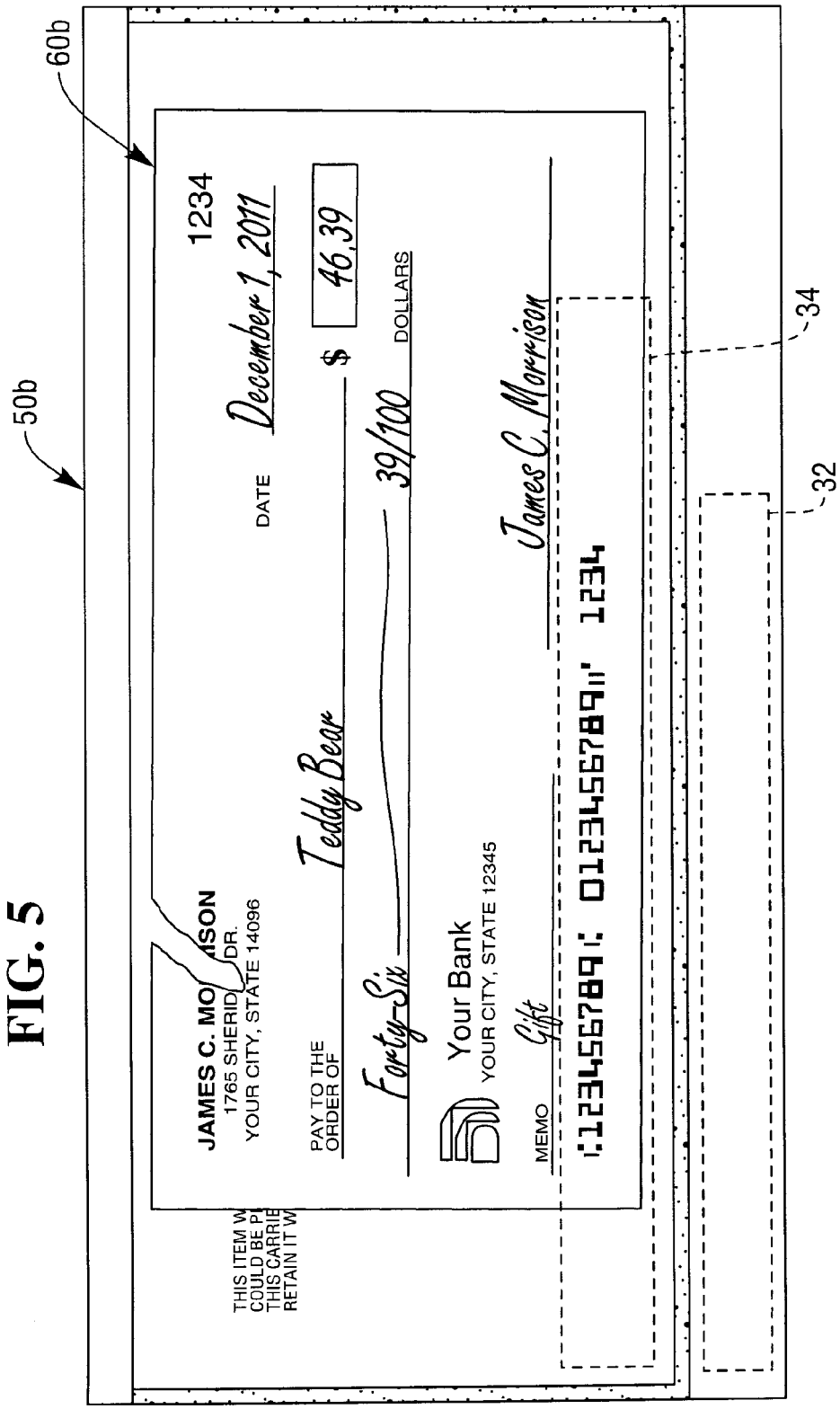
FIG. 5 is a view similar to FIG. 4, and showing a captured image of a non-encoded type of carrier envelope which contains the torn check of FIG. 2.

Referring to FIG. 5, a captured image of a non-encoded type of carrier envelope which contains the torn check of FIG. 2 is illustrated. The non-encoded carrier envelope in the image is designated with reference numeral "50b", and is referred to herein as "carrier 50b". The torn check in the image is designated with reference numeral "60b", and is referred to herein as "check 60b".

After either carrier 50a and check 60a of FIG. 4 are captured or carrier 50b and check 60b of FIG. 5 are captured, the front OCR reader 23a (or MICR codeline reader 20 as shown in FIG. 1) scans first predefined area 32 (shown in both FIGS. 4 and 5) and/or second predefined area 34 in accordance with a method process and sub-process as will be described hereinbelow.

Figure 6A:
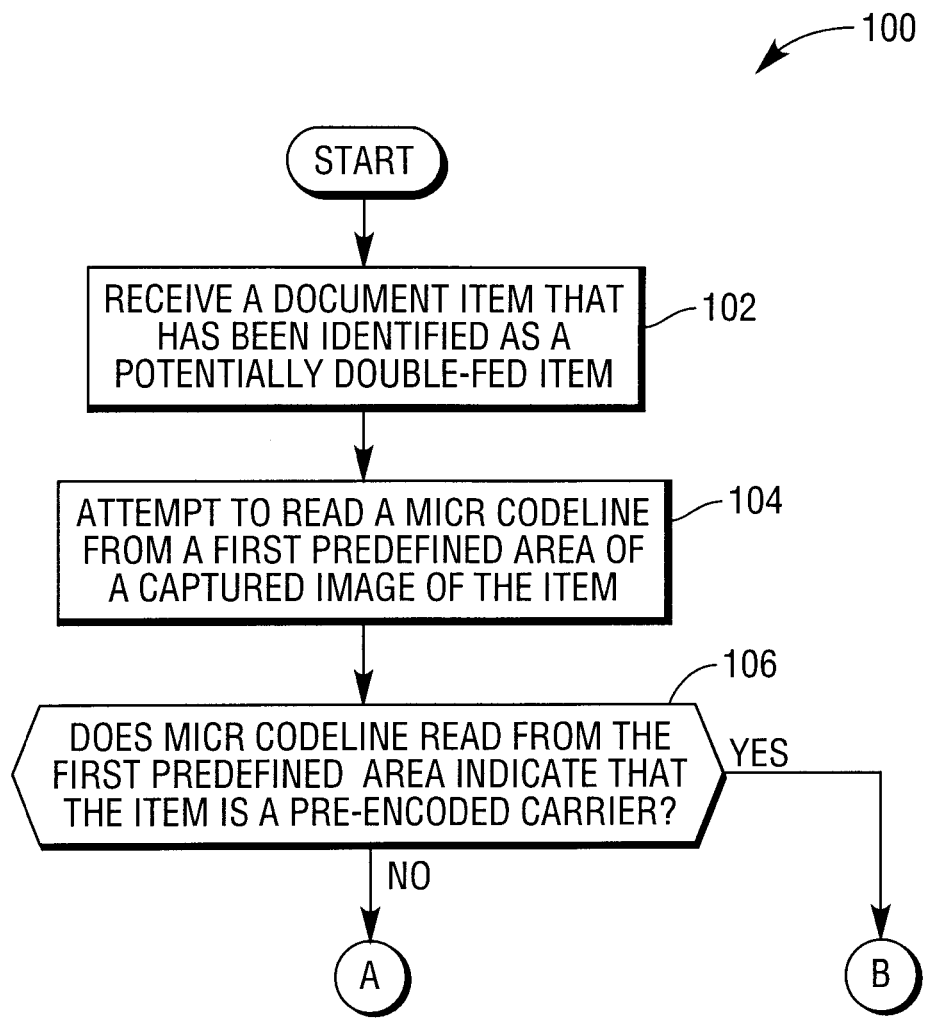
FIG. 6 depicts a flow diagram of a method which may be implemented by the system of FIG. 1.
Figure 6B:
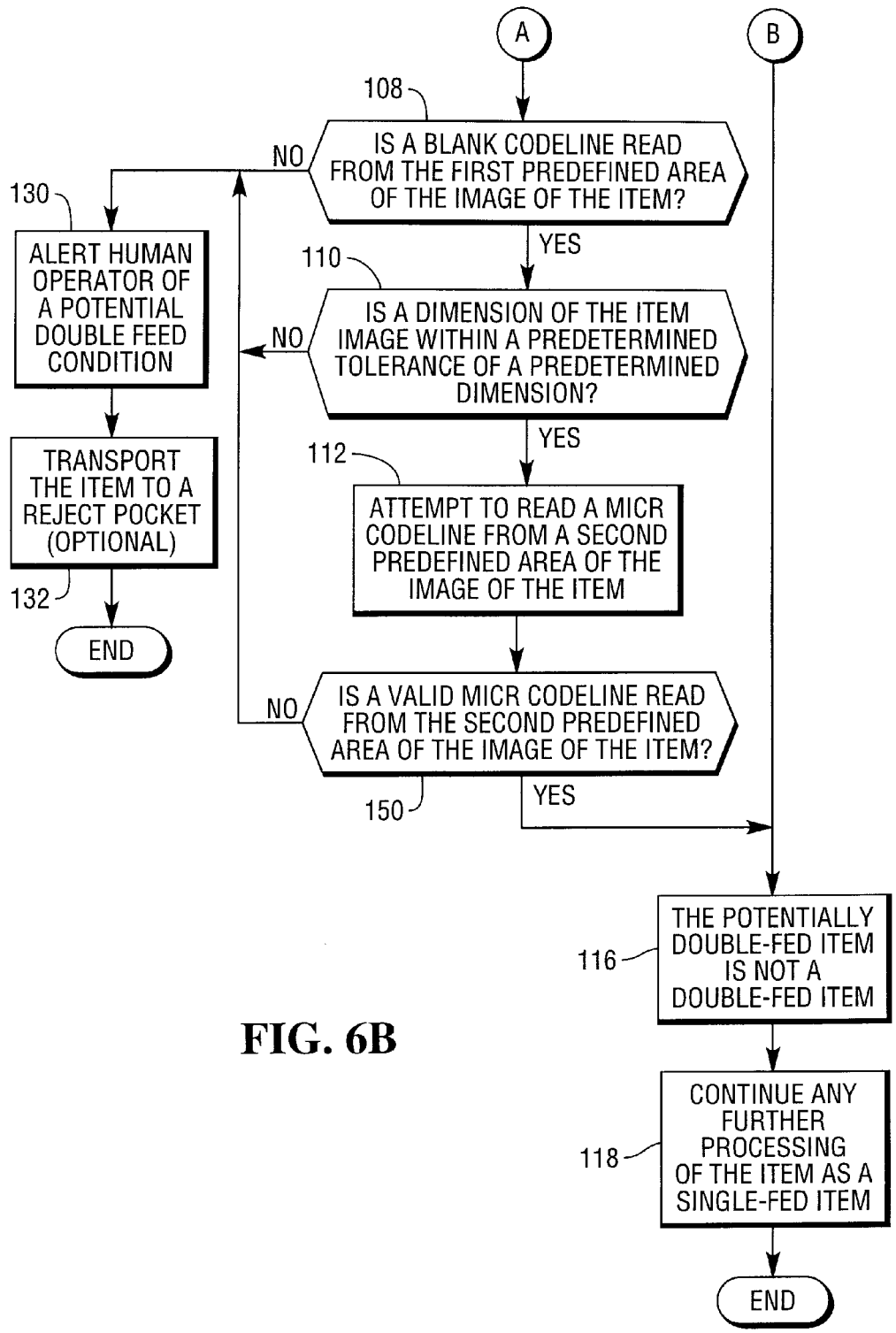

Referring to FIG. 6, flowchart 100 depicts a method of operation of the image-based check processing system 10 of FIG. 1. It is conceivable that any combination of the steps shown in flowchart 100 of FIG. 6 may be performed.

After an image of a document item which has been identified as a potentially double-fed item is received (step 102), an attempt is made by front OCR reader 23a to read a MICR codeline from first defined area 32 (FIGS. 4 and 5) of the item image (step 104). A determination is then made (step 106) as to whether the attempted read of a MICR codeline from first predefined area 32 indicates that the item image is that of a pre-encoded carrier envelope. If the determination in step 106 is affirmative (i.e., the MICR codeline read from first predefined area 32 indicates that the item image is that of a pre-encoded carrier envelope), then the process proceeds to step 116. In step 116, a conclusion is made that the potentially double-fed item is not a double-fed item. The item is then continued to be processed as a single-fed item (step 118). The process ends.

However, if the determination made back in step 106 is negative (i.e., the MICR codeline read from first predefined area 32 indicates that the item image is not that of a pre-encoded carrier envelope), then the process proceeds to step 108. In step 108, a determination is made as to whether a blank codeline has been read from first predefined area 32 of the item image. A "blank" codeline may comprise a line which is entirely blank, or a line of only a limited number of reject characters. As examples, a "blank" line may have no numbers, have no symbols, or have a number of rejects from document noise.

If the determination in step 108 is negative (i.e., a blank MICR codeline has not been read from first predefined area 32), then the process proceeds to step 130 in which a human operator is alerted of a potential double feed condition. As an example, the operator may be alerted by way of a pop-up message appearing on a display in transport operator interface 43 (FIG. 1). As shown in step 132, the physical document item corresponding to the item image may be transported to a reject pocket of the pocket device 30 (FIG. 1). The process ends.

However, if the determination made back in step 108 is affirmative (i.e., a blank MICR codeline has been read from first predefined area 32), then the process proceeds to step 110. In step 110, a determination is made as to whether a dimension of the item image is within a predetermined tolerance of a predetermined dimension. As an example, a determination may be made as to whether length of the item image is within a predetermined tolerance of a predetermined length dimension. If the determination in step 110 is negative (i.e., the dimension of the item image is not within a predetermined tolerance of a predetermined dimension), then the process proceeds to step 130 in which a human operator is alerted of a potential double feed condition. As shown in step 132, the physical document item corresponding to the item image may be transported to a reject pocket of the pocket device 30. The process ends.

However, if the determination in step 110 is affirmative (i.e., the dimension of the item image is within a predetermined tolerance of a predetermined dimension), then the process proceeds to step 112. In step 112, an attempt is made by front OCR reader 23a to read a MICR codeline from second predefined area 34 (FIG. 5) of the item image. A determination is then made in step 150 as to whether a valid MICR codeline has been read from second predefined area 34 of the item image. If the determination in step 150 is negative (i.e., the MICR codeline which has been read from the second predefined area 34 of the item image is not a valid MICR codeline), then the process proceeds to step 130 in which a human operator is alerted of a potential double feed condition. As shown in step 132, the physical document item corresponding to the item image may be transported to a reject pocket of the pocket device 30. The process ends.

However, if the determination made back in step 150 is affirmative (i.e., the MICR codeline which has been read from second predefined area 34 of the item image is a valid MICR codeline), then the process proceeds to step 116. In step 116, a conclusion is made that the potentially double-fed item is not a double-fed item. The item is then continued to be processed as a single-fed item (step 118). The process ends.

Figure 7:
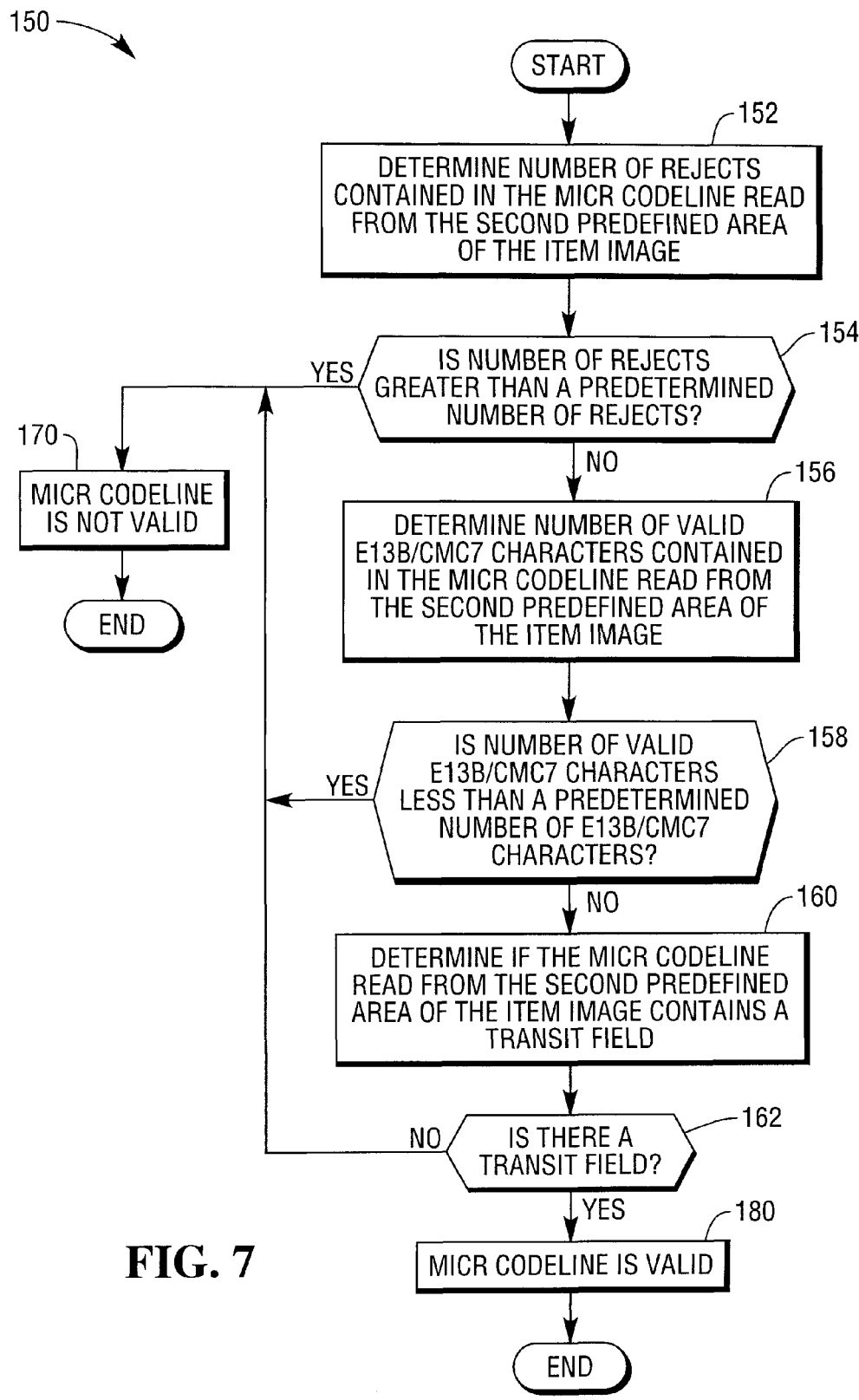
FIG. 7 depicts a flow diagram of sub-steps of a step in the flow diagram of FIG. 6.

Referring to FIG. 7, flowchart 150 depicts sub-steps of a step contained in flowchart 100 of FIG. 6. More specifically, flowchart 150 is a detailed flowchart for step 150 shown in FIG. 6 in which a determination is made as to whether a valid MICR codeline has been read from second predefined area 34 (FIGS. 4 and 5) of the item image. It is conceivable that any combination of the steps shown in flowchart 150 of FIG. 7 may be performed.

After a determination is made as to number of rejects contained in the MICR codeline read from second predefined area 34 of the item image (step 152), a determination is made as to whether number of rejects exceeds a predetermined number of rejects (step 154). If the determination in step 154 is affirmative (i.e., number of rejects is greater than the predetermined number of rejects), then a conclusion is made that the MICR codeline is not valid (step 170). However, if the determination in step 154 is negative (i.e., number of rejects is not greater than a predetermined number of rejects), then the process proceeds to step 156.

After a determination is made as to number of valid E13B/CMC7 characters contained in the MICR codeline read from second predefined area 34 of the item image (step 156), a determination is made as to whether number of valid E13B/CMC7 characters is less than a predetermined number of E13B/CMC7 characters (step 158). If the determination in step 158 is affirmative (i.e., number of valid E13B/CMC7 characters is less than a predetermined number of E13B/CMC7), then a conclusion is made that the MICR codeline is not valid (step 170). However, if the determination in step 158 is negative (i.e., number of valid E13B/CMC7 characters is not less than a predetermined number of E13B/CMC7), then the process proceeds to step 160.

A determination is made as to whether the MICR codeline read from second predefined area 34 of the item image contains a transit field (steps 160, 162). If the determination made in steps 160, 162 is negative (i.e., the MICR codeline does not contain a transit field), a conclusion is made that the MICR codeline is not valid (step 170). As an example, presence of a transit field may be established by determining if the MICR codeline read from second predefined area 34 of the item image has two transit Q symbols. However, if the determination in steps 160, 162 is affirmative (i.e., the MICR codeline does contain a transit field), then a conclusion is made that the MICR codeline read from second predefined area 34 of the item image is valid (step 180).

It should be apparent that the above description describes a combination of a number of factors in determining whether a document item being processed along the document track 14 is a double feed. One factor is whether MICR codeline information is readable from first predefined area 32 of the item image. Another factor is whether valid MICR codeline information is readable from second predefined area 34 of the item image. Still another factor is the number of different ways of determining if a valid MICR codeline has been read from second predefined area 34 of the item image.

It should further be apparent that example method described hereinabove provides an improved double feed detecting feature. This feature may be implemented by a double feed detecting algorithm which is expressed in a computer program containing executable instructions which, when executed, carry out steps of the algorithm to provide the feature. By providing an improved double feed detecting feature, involvement of human-operator time to reprocess a missed document item is reduced. This results in cost savings during operation of the image-based check processing system 10.

It should also be apparent that example method described hereinabove is performed by a computer having a memory executing one or more programs of instructions which are tangibly embodied in a program storage medium readable by the computer. A single computer associated with image-based check processing system 10 may perform example method described hereinabove. However, it is conceivable that more than one computer associated with the image-based check processing system 10 perform example method described hereinabove.

Although the above description describes double feed detection being performed in real time, it is conceivable that double feed detection be performed in batch. As an example in the case of batch processing, controlling software for software OCR would process the image of a document item and mark suspect double feed items. It is conceivable that the controlling software for OCR performs operations to make the decision to either accept or reject the document item and direct the document item to the appropriate pocket in the pocket device 30. A human operator would then verify item images and also possibly verify physical document items to ensure that there are no extra document items in pockets of the pocket device 30.

Further, although the above description describes double feed detection being performed in an image capture transport of a check processing system during a first pass of check processing as described hereinabove, it is conceivable that double feed detection may be performed in an encoding and sorting transport of the check processing system during a second pass of check processing.

While the present invention has been illustrated by the description of example processes and system components, and while the various processes and components have been described in detail, applicant does not intend to restrict or in any limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method of operating an image-based check processing system to detect a double feed condition of document items, the method comprising:
    reading one magnetic ink character recognition (MICR) codeline from a first predefined area of an image of a document item;
    based upon the read of one MICR codeline from the first predefined area of the item image, determining if the document item is a carrier envelope;
    concluding that the document item is not a double-fed item when a determination is made that the document item is a carrier-envelope based upon the read of one MICR codeline from the first predefined area of the item image;
    concluding that the document item is potentially a double-fed item when a determination is made that the document item is not a carrier envelope based upon the read of one MICR codeline from the first predefined area of the item image;
    reading one MICR codeline from a second predefined area which is different from the first predefined area of the item image;
    based upon the read of one MICR codeline from the second predefined area of the item image, determining if the item image has a valid MICR codeline;
    concluding that the document item is not a double-fed item when a determination is made that one valid MICR codeline has been read from the second predefined area of the item image;
    concluding that the document item is potentially a double-fed item when a determination is made that one valid MICR codeline has not been read from the second predefined area of the item image; and
    alerting an operator to indicate a potentially double-fed item when a determination is made that document item is not a carrier envelope based upon the read of one MICR codeline from the first predefined area of the item image and a determination is made that one valid MICR codeline has not been read from the second predefined area of the item image.

2. A method according to claim 1, further comprising:
    based upon the read of one MICR codeline from the first predefined area of the item image, determining if one blank MICR codeline has been read; and
    alerting an operator to indicate a potentially double-fed item when a determination is made that one blank codeline has not been read from the first predefined area of the item image.

3. A method according to claim 1, further comprising:
    based upon the read of one MICR codeline from the first predefined area of the item image, determining if a dimension of the item image is within a predetermined dimension; and
    alerting an operator to indicate a potentially double-fed item when a determination is made that the dimension of the item image is not within the predetermined dimension.

4. A method according to claim 1, wherein the method is performed by a computer having a memory executing one or more programs of instructions which are tangibly embodied in a program storage medium readable by the computer.

5. A method according to claim 1, wherein determining if the item image has one valid MICR codeline includes:
    determining if the MICR codeline which has been read from the second predefined area of the item image comprises two transit Q symbols; and
    concluding that the MICR codeline which has been read from the second predefined area of the item image is not one valid MICR codeline when a determination is made that the MICR codeline does not comprise two transit Q symbols.

6. A method according to claim 1 wherein determining if the item image has one valid MICR codeline includes:
    determining if the MICR codeline which has been read from the second predefined area of the item image comprises at least a predetermined number of E13B/CMC7 characters; and
    concluding that the MICR codeline which has been read from the second predefined area of the item image is not one valid MICR codeline when a determination is made that the MICR codeline does not comprise at least a predetermined number of E13B/CMC7 characters.

7. A method according to claim 1, wherein determining if the item image has a valid MICR codeline includes:
    determining if the MICR codeline which has been read from the second predefined area of the item image is not one valid MICR codeline when a determination is made that the MICR codeline comprises more than a predetermined number of rejects; and
    concluding that the MICR codeline which has been read from the second predefined area of the item image is not a valid MICR codeline when a determination is made that the MICR codeline comprises more than a predetermined number of rejects.

8. A check processing apparatus comprising:
a document feed mechanism having a document feed path;
a magnetic ink character recognition (MICR) codeline reader arranged to read a MICR codeline from a document item as the document item is transported along the document feed path from an upstream end of the document feed path to a downstream end of the document feed path;
an imaging camera arranged to capture image data which is representative of an image of the document item as the document item is transported along the document feed path; and
an optical character recognition (OCR) reader arranged to perform an OCR read of an image of the document item as the document item is transported along the document feed path; and
a processor programmed to (i) read one MICR codeline from a first predefined area of the item image, (ii) determine if the document item is a carrier envelope based upon the read of one MICR codeline from the first predefined area of the item image, and (iii) conclude that the document item is not a double-fed item when a determination is made that the document item is a carrier envelope, (iv) conclude that the document item is potentially a double-fed item when a determination is made that the document item is not a carrier envelope, (v) read one MICR codeline from a second predefined area which is different from the first predefined area of the item image, (vi) determine if the second predefined area of the item image has one valid MICR codeline based upon the read of one MICR codeline from the second predefined area of the item image, (vii) conclude that the document item is not a double-fed item when a determination is made that one valid MICR codeline has been read from the second predefined area of the item image, (viii) conclude that the document item is potentially a double-fed item when a determination is made that one valid MICR codeline has not been read from the second predefined area of the item image, and (ix) alert an operator to indicate a potentially double-fed item when a conclusion is made that the document item is potentially a double-fed item.

9. A check processing apparatus according to claim 8, wherein the processor is programmed to (x) determine if one blank MICR codeline has been read based upon the read of one MICR codeline from the first predefined area of the item image, and (xi) alert an operator to indicate a potentially double-fed item when a determination is made that one blank codeline has not been read from the first predefined area of the item image.

10. A check processing apparatus according to claim 8, wherein the processor is programmed to (x) determine if a dimension of the item image is within a predetermined dimension based upon the read of one MICR codeline from the first predefined area of the item image, and (xi) alert an operator to indicate a potentially double-fed item when a determination is made that the dimension of the item image is not within the predetermined dimension.

* * * * *